July 7, 1942.  H. ERNST ET AL  2,289,110
MILLING SPEED CALCULATOR
Filed Aug. 11, 1941  2 Sheets-Sheet 1
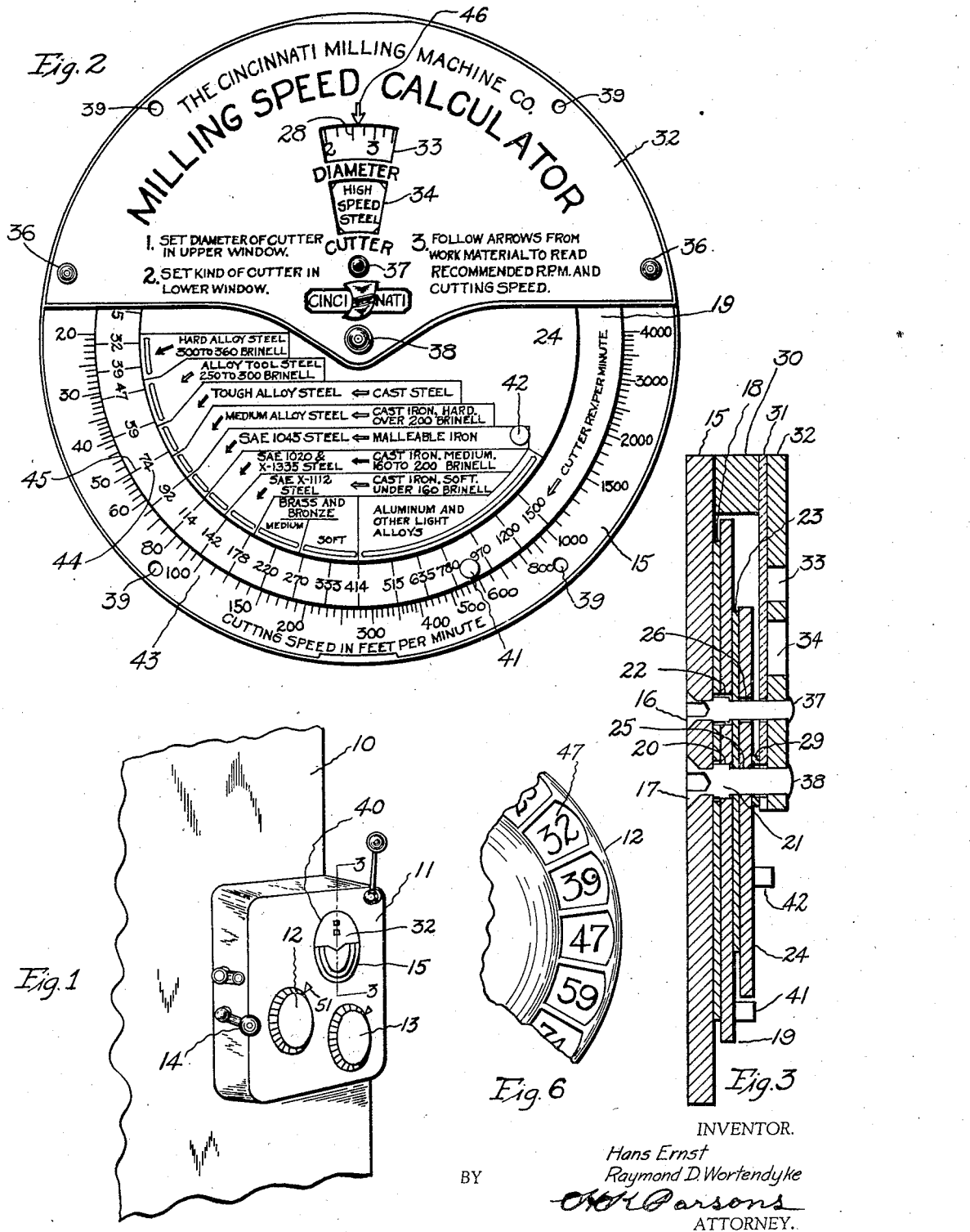
INVENTOR.
Hans Ernst
Raymond D. Wortendyke
BY
ATTORNEY.

July 7, 1942.    H. ERNST ET AL    2,289,110
MILLING SPEED CALCULATOR
Filed Aug. 11, 1941    2 Sheets-Sheet 2

INVENTOR.
Hans Ernst
Raymond D. Wortendyke
BY
ATTORNEY.

Patented July 7, 1942

2,289,110

UNITED STATES PATENT OFFICE 2,289,110

MILLING SPEED CALCULATOR

Hans Ernst and Raymond D. Wortendyke, Cincinnati, Ohio, assignors to The Cincinnati Milling Machine Co., Cincinnati, Ohio, a corporation of Ohio Application August 11, 1941, Serial No. 406,346

3 Claims. (Cl. 235—84)

This invention relates to improvements in speed selecting mechanism for machine tools and has particular reference to a structure of this character adapted for application to or utilization in connection with milling machines or similar metal working tools.

Modern milling machines are generally equipped with an organized variable speed transmission adjustable to effect a multiplicity of rates of rotation of the cutter spindle of the machine by small increments and preferably in a geometrically progressing speed range.

To facilitate quick selection of these speeds with minimum effort on the part of the operator various substantially automatic speed changing mechanisms have been provided such, for example, as those shown in U. S. Patent No. 2,010,556, in which a suitable dial device containing an indication of the potential speeds is provided on the machine.

The actual selection of the speeds for performance of the milling or cutting operation with different diameters of cutters, which cutters are formed from different materials and operate on a great variety of metals as work pieces, is still left to the judgment of the operator who frequently, due to production demands may not be highly versed in all the problems attendant upon attaining most efficient results within the capacity of the cutter under the varying uses to which such machine may be applied.

It is, therefore, one of the purposes of the present invention to provide a device applicable to such machines as a unitary part thereof in juxtapositioned relation to the speed indicating dial of the machine which will enable the operator readily to select the most efficient speed setting for the particular operation to be performed.

A further object of the present invention is the provision of a simple and efficient device applicable to or utilizable in connection with a milling machine or like machine tool which will accurately combine the several variable factors of tool material, tool diameter and work piece characteristics in a manner graphically to indicate the proper cutter speed selection for performance of the tooling operation, the cutting speed in feet per minute which is being effected by a given selection of cutter and rate of actuation thereof, and therefore the correctness of the cutting speed or alternatively the nature of material of cutter to be utilized, and performance of the tooling operation at a desired speed.

A further object of the invention is the provision of an improved device which will increase the efficiency of both skilled and unskilled machine operators and enable them to obtain maximum production without liability of damage to work, cutter or machine.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a fragmentary view of one form of the present invention applied to a milling machine.

Figure 2 is a detail front elevation of an embodiment of the invention.

Figure 3 is a vertical sectional view as on the line 3—3 of Figure 1.

Figure 6 is an enlarged fragmentary view of the milling machine speed dial.

Figure 4:
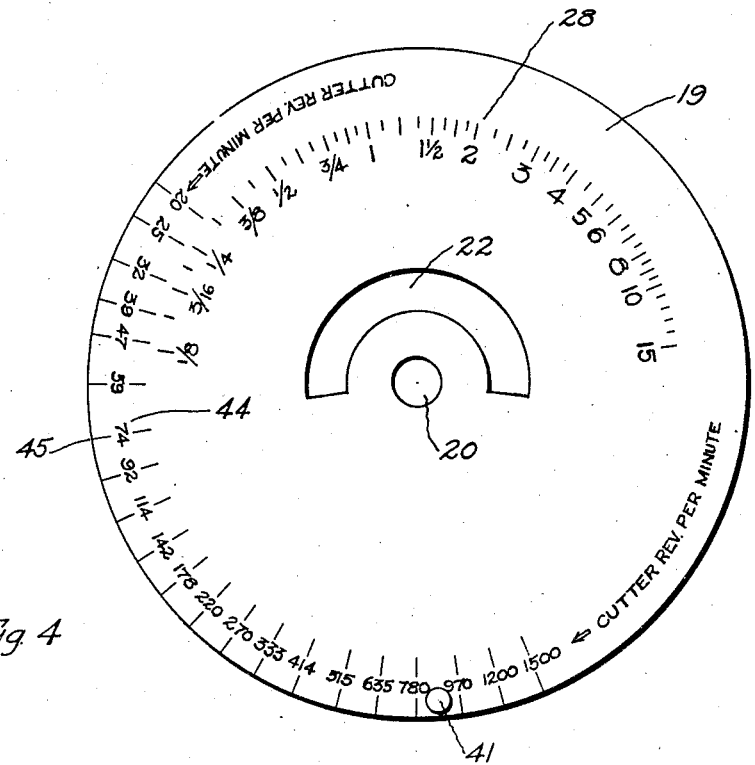
Figure 4 is a view in elevation of the major adjustable disc element.
Figure 5:
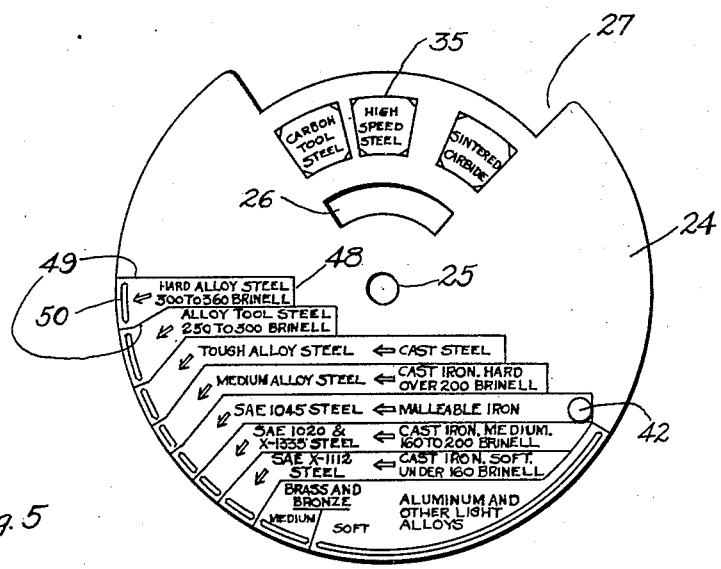
Figure 5 is a similar view of the normally superimposed minor disc section.

In the drawings the numeral 10 designates the column of a milling machine of the type shown, for example, in U. S. Patent No. 2,010,556, which serves to support the speed control bracket 11 bearing the speed rate indication dial 12 and feed rate indication dial 13, together with the selection controlling lever 14, these parts being of the general character indicated in the patent above referred to.

Mounted on the bracket immediately adjacent the dial 12 is the base plate 15 of the present invention provided with a pair of projecting studs 16 and 17. A spacer member, such as 18, is jointly supported by studs 16 and 17 while rotatable on the face of this member is the major disc 19 having an aperture 20 to receive the shouldered portion 21 of the stud 17 which serves as a journal bearing on which the disc 19 rotates. The disc is further provided with an arcuate slot 22 through which stud 16 projects and which by engagement with the termini of the arcuate slot serves to limit the rotary or oscillatory movement of plate 19.

Superimposed on the plate 19 is a second spacer element 23 jointly engaged by the studs 16 and 17 and serving as an underlying support for the minor disc element 24 which has a central aperture 25 receiving stud 17. This disc is provided with a short arcuate slot 26 receiving stud 16 for limiting its oscillatory movement about the pivot.

It is further formed with an arcuate peripheral notch or recess as at 27 through which a portion of the indicating means or indicia at 28 on disc 19 may be viewed.

A spacing washer 29 on stud 21 and an arcuate spacing block 30 circumscribing the upper periphery of disc 19 serve rigidly to support in slightly spaced relation the disc 24, the transparent sheet 31 and cover plate 32 of the device. This cover plate is provided with apertures or windows as at 33 through which the indicia 28 on disc 19 may be viewed and at 34 through which may be seen selected indicia 35 on disc 24, the purposes of which are hereinafter described. Suitable rivets or fasteners, such as 36, and heads 37 and 38 formed respectively on studs 16 and 17 serve to secure the parts together as a unitary assembly. This assembly may then be fastened on the machine by employment of suitable fasteners and inserted through the securing apertures 39.

The several structural elements above referred to have been indicated in their assembled relation in Figure 2 of the drawings in their normal proportions and have been shown in exaggerated size as to thickness in Figure 3 of the drawings, it being understood that the several elements are normally formed from thin metal plates providing a compact assembly, neatly applicable in a suitable recess 40 provided for its reception in the bracket 11.

From the foregoing it will be noted that the disc 19 is suitably supported for rotation with respect to plate 15 to an extent limited by interengagement of the termini of its slot 22 with stud 16, a suitable actuating knob or handle 41 being preferably provided to facilitate effecting its oscillatory movement. Similarly, disc 24 may be oscillated within the limits prescribed by slot 26 and stud 16, its oscillation being effectable as by the handle or knob 42 while the interposition of the non-rotatable element 23 between the discs insures their independent movement, preventing frictional drag between the parts, effecting undesired simultaneous shifting thereof.

By reference to Figure 2 it will be noted that the disc 15 is provided with an arcuate logarithmic scale 43 reading in cutting speed in feet per minute while the adjacent periphery of disc 19 is provided with suitable means such as numerical indicia 44 and guide lines or pointers 45 designated as reading in cutter revolutions per minute. While this scale may be subdivided in any desired manner it is preferable, as indicated, that the readings be of the particular spindle revolutions attainable by the successive adjustments of the organized variable speed mechanism of the machine, which speeds are similarly designated by the indicia 47 carried by the dial 12 coupled with the speed adjusting mechanism as disclosed in U. S. Patent No. 2,010,556 previously referred to.

It is to be noted that both the indicia 43 and 44 are in the form of scales which are divided proportionately to the logarithms of the numbers. The indicia 28 provide means for determining the proper setting of the disc 19 for relative positioning of the indicating means or devices 43 and 44. These indicating means 28 read in terms of diameter of cutter to be employed and are similarly provided proportionately to the logarithm of the diameters in an arcuate position concentric with the stud 20 but disposed inwardly with respect to the designations 44, permitting their overlapping relationship as shown in Figure 4, and at the same time they are angularly disposed with respect to the designation means 44 to such extent that when any individual designation 28 on disc 19 is aligned with the indicating means or pointer 46 on cover plate 32 adjacent window 33 the several designations 44 of potentially selectable machine speeds will be properly aligned with the several indicating means 43 designating the cutting speed in feet per minute of a tooth on a cutter of the selected diameter at any one of the potentially available speeds.

As will be readily understood by those conversant with the art of milling, in determination of the most efficient cutting speed in feet per minute it is necessary to consider both the material being operated upon, whether, for example, the same be of hard alloy steel at one extreme or soft cast iron, brass or aluminum, for example, at the other extreme, and also the material of the cutter being employed as, for example, whether the same be of carbon tool steel, sintered carbide or the like.

The diameter of the cutter being known and having been suitably positioned within window 33, the cooperative relationship of indicia 43 and 44 serve to designate the possible spindle rate selections and the cutting speed effected for these selections. The material of the cutter itself being also known, the suitable indicating means or designations 35 are then brought into registry with window 34 by oscillatory movement of the disc 24. This disc, it will be noted, is provided with a series of blocks 48 containing descriptive matter as to various potentially machinable types of metal. Extending from these blocks are division lines 49 enclosing terminal designation bars 50 logarithmically arranged in accordance with the potential speed variant for effecting satisfactory machining of the particular items within the block.

It will thus be noted that by a suitable positioning of the cutter material designation in the window or viewing aperture 34, the designating means 50 will be variably positioned with respect to the cutter revolution and cutting speed designations.

It is then merely necessary for the operator following out the block 48 containing the indication of the particular material being operated upon through the bordering lines 49 to select the speed or speeds aligned with its designation 50 and then by actuation of the handle 14 cause shifting of the gears of the machine until designation 47 on dial 12 aligns with indicator 51 when the machine will be set for proper performance of the tooling operation in accordance with the potential variables of cutter diameter and cutter material. In the particular setting indicated, for example, if the operator were employing the machine to mill hard alloy steel, he would have available a selection of either 32 or 39 R. P. M. of the cutter spindle, giving him a cutting rate of between 22 and 27 feet per minute. On the other hand, if he were operating on soft brass his preferred spindle speed with the same cutter would be 333 R. P. M., giving him a cutting speed of about 225 feet a minute.

From the foregoing description taken in connection with the accompanying drawings the construction and manner of utilization of the present invention should be readily apparent and it will be seen that there has been provided in connection with a milling machine having an organized variable speed transmission for effecting a prescribed sequence of cutter speeds, cooperating means for determining the selection of such speeds including relatively adjustable members provided with cooperating indicating means corresponding in part with the potentially available speed designations of the machine and in part with the variables which must be considered in determining a speed selection and that by proper relative positioning of the known factor designations the suitable utilizable speed for the particular job is accurately indicated in juxtaposition to the speed indicator of the machine.

It will further be understood that the exact mechanical relationship of the parts relative to locations and positionings of the scales or indicating media and windows, pointers or other location points for determination of readings may be modified or varied or interchanged as to particular carrying members so long as the essential operating characteristics are maintained without departing from or exceeding the spirit of our invention.

In the performance of milling operations the matter of cutter as to diameter and material and its speed of operation may be left entirely to the judgment of the operator or alternatively in certain types of work layout the cutting speed in feet per minute to be employed may be specified for the operation or there may be but a particular cutter available and it is up to the machine operator to determine the rate at which the cutter is to be operated while the knowledge of various operators as to the various variables to be taken into account is not always equal.

Mathematically, of course, the cutting speed or any of the other variables may be determined from the formula:

$$CS = \frac{D\pi N}{12}$$

In this, CS indicates the cutting speed in feet per minute, D the diameter of the cutter and N the number of revolutions per minute of the cutter. In the use of the present invention, however, it is unnecessary to perform the calculations either arithmetically or by the use of logarithms. In the embodiment illustrated the device is shown as applied to a milling machine bracket for determination of cutter speeds, but it will be understood that it is equally utilizable when the work in place of the cutter is the rotated member as in the case of lathes, grinding machines or the like. In the form chosen for illustration it comprises a base member having a cutting speed scale and indicator and a primary disc rotatable on the base member having indicia providing scales reading in terms of diameter and revolutions per minute.

These scales are so angularly disposed and proportioned with respect to each other and to the speed scale that selective registry of the designations on one scale on the disc with a prescribed indicator on the base member will effect the necessary relative positionings of the revolution and cutting speed designations to indicate the several potential surface speeds of a member of selected diameter at the different revolutions per minute. There has additionally been provided a second rotatable member having graduations proportional to the cutting qualities of different machinable materials. This member is mounted for movement to bring its graduations selectively into registry with the revolutions and speed scales. Means are provided for designating the work piece material represented by said graduations which it will be noted by reference to the drawings are unequal in amount but representative successively of the potential efficient cutting speed ranges of the respective materials. This second rotatable member is additionally provided with means for selectively designating the cutter material utilizable for machining the indicated work piece material at a given selection of speeds and diameters and means are provided for determining the correct relationship of this second adjustable member with respect to the base and first rotatable member according to the material of the cutter, these means in the form illustrated taking the form of a window or aperture on the base unit through which the cutter designations can be read.

Attention is further invited to the fact that the base member includes a cover section 32 centrally provided with windows for reading of the diameter and cutting material scales or designations and extending in partially overlying relation to the graduated portion of the base plate serving as an entirety to blank off non-utilizable designations according to the angular relationships of the two adjustable discs with respect to the supporting base element.

To facilitate independent and accurate adjustment of the respective discs independent operating devices are provided therefor and means interposed therebetween preventing frictional actuation of one by the other and additional suitable stop mechanisms are provided for limiting their range of movement.

We claim:

1. A device of the character described comprising a base member having a plurality of windows formed therein and having unequally spaced indicia providing a cutting speed indicating scale, and a second member pivoted to the base member having a portion disposed in underlying relation to the window, said portion bearing indicia indicative of cutter diameters, said second member having an additional portion disposed in cooperative relation with the indicia on the first member, said portion having logarithmically arranged indicia indicative of potential revolutions per minute of a cutter, the diameter and revolution scales being so proportioned and angularly related that registry of the cooperating scales on the first and second members will jointly indicate the cutting speed for various potential revolutions of a cutter of the diameter indicated in the window, a third member rotatably mounted on the first two members, said third member having a portion extending into proximity to the cooperating scales of the other two members and an additional portion in underlying relation to another of the windows and bearing respectively cutter material designations selectively alignable with the window and work material designations proportional in extent to the varying machinable characteristics of different materials, said latter designations cooperating with scales on the other two members to indicate the material which can be satisfactorily worked for a selection of cutter diameter, material, and a given number of revolutions per minute as determined by the relative positionings of the indicia on the first and second members.

2. A device of the character described including a base plate having an arcuate series of logarithmically arranged designations formed thereon, a pivot stud secured to and projecting from said base member, a disc rotatably mounted on the pivot stud having a series of logarithmically arranged designations reading in terms of revolution per minute about a portion of its periphery proportioned to cooperate with the designations on the base plate, a limiting stud carried by the base plate, the disc having an arcuate slot formed therein to receive the stud whereby the stud determines the extent of oscillatory movement of the disc on the base plate, a segmental cover plate carried by the base plate in partial overlying relation to the disc, said cover plate having a window formed therein in overlying relation to a portion of the periphery of the disc and a cutter diameter scale formed on the disc in underlying relation to the window whereby on oscillation of the disc different designations of diameter may be moved into registry with the window for determination of the positioning of the disc for proper registry of the speed and revolution scales on the base plate and disc respectively, a second smaller disc rotatably mounted on the stud having an exposed portion provided with indicia as to machinable characteristics of selected materials, said disc having an arcuate slot formed therein receiving the stud whereby movement of the disc is restricted, the cover having a second window formed therein and indicia designating cutter material characteristics carried by the disc and selectively positionable beneath the window upon oscillation of the disc for determining the variable positionings thereof with respect to the window and those of its material designations with respect to the scales on the base plate and first disc, substantially as and for the purpose described.

3. A device of the character described including a base plate having an arcuate series of logarithmically arranged designations formed thereon, a pivot stud secured to and projecting from said base member, a disc rotatably mounted on the pivot stud having a series of logarithmically arranged designations reading in terms of revolution per minute about a portion of its periphery proportioned to cooperate with the designations on the base plate, a limiting stud carried by the base plate, the disc having an arcuate slot formed therein to receive the stud whereby the stud determines the extent of oscillatory movement of the disc on the base plate, a segmental cover plate carried by the base plate in partial overlying relation to the disc, said cover plate having a window formed therein in overlying relation to a portion of the periphery of the disc and a cutter diameter scale formed on the disc in underlying relation to the window whereby on oscillation of the disc different designations of diameter may be moved into registry with the window for determination of the positioning of the disc for proper registry of the speed and revolution scales on the base plate and disc respectively, a second smaller disc rotatably mounted on the stud having an exposed portion provided with indicia as to machinable characteristics of selected materials, said disc having an arcuate slot formed therein receiving the stud whereby movement of the disc is restricted, the cover having a second window formed therein and indicia designating cutter material characteristics carried by the disc and selectively positionable beneath the window upon oscillation of the disc for determining the variable positionings thereof with respect to the window and those of its material designations with respect to the scales on the base plate and first disc, the diameter designations on the first disc being arranged nearer the pivot stud than the revolution indications on said disc, and the second disc having a portion thereof adjacent the first window in the cover cut away to prevent blanking of the first window by the second disc in any potential position of oscillatory adjustment thereof.

HANS ERNST.
RAYMOND D. WORTENDYKE.